(12) United States Patent
Stimming et al.

(10) Patent No.: US 9,424,450 B2
(45) Date of Patent: Aug. 23, 2016

(54) APPARATUS AND METHOD FOR IDENTIFYING AND LOCALIZING OBJECTS

(71) Applicant: SICK AG, Waldkirch, DE (US)

(72) Inventors: Christian Stimming, Waldkirch (DE); Christian Rapp, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 14/672,790

(22) Filed: Mar. 30, 2015

(65) Prior Publication Data

US 2015/0286849 A1 Oct. 8, 2015

(30) Foreign Application Priority Data

Apr. 2, 2014 (EP) .................................... 14163115

(51) Int. Cl.
*G06K 7/10* (2006.01)
*G01S 3/781* (2006.01)
*G06K 5/00* (2006.01)
*G06K 7/00* (2006.01)

(52) U.S. Cl.
CPC ............. *G06K 7/10297* (2013.01); *G01S 3/781* (2013.01); *G06K 5/00* (2013.01); *G06K 7/0008* (2013.01); *G06K 7/10386* (2013.01)

(58) Field of Classification Search
None
See application file for complete search history.

(56) References Cited

U.S. PATENT DOCUMENTS

| 6,150,948 | A | 11/2000 | Watkins | |
| 8,159,350 | B2 * | 4/2012 | Bauchot | G06K 7/0008 340/10.1 |
| 2009/0207024 | A1 | 8/2009 | Schatz | |
| 2010/0045436 | A1 * | 2/2010 | Rinkes | H04Q 9/00 340/10.1 |
| 2010/0060453 | A1 | 3/2010 | Kushida | |
| 2012/0044074 | A1 * | 2/2012 | Mulla | G06Q 10/08 340/572.1 |
| 2012/0212327 | A1 * | 8/2012 | Torabi | G06K 7/10099 340/10.1 |

FOREIGN PATENT DOCUMENTS

| DE | 199 40 403 A1 | 3/2001 |
| DE | 10 2009 030 076 A1 | 12/2010 |
| EP | 2 012 253 B1 | 8/2009 |

OTHER PUBLICATIONS

European Search Report dated Aug. 6, 2014 in corresponding European Application No. 14163115.0.
Miesen, et al., "Holographic Localization of Passive UHF RFID Transponders", IEEE International Conference on RFID, pp. 32-37, 2011.

* cited by examiner

*Primary Examiner* — Mohamed Barakat
(74) *Attorney, Agent, or Firm* — Nath, Goldberg & Meyer; Jerald L. Meyer

(57) ABSTRACT

An apparatus (10) for identifying and localizing objects (22) is provided having a position determination device (14) for determining object positions and having an RFID reading device (12) for receiving an RFID signal from an RFID transponder (24) and for reading RFID information from the RFID signal. The apparatus (10) has an RFID localization device (18) for determining transponder positions with the aid of the RFID signal and has an association device (20) which is configured to associate objects (22) and RFID transponders (24) with one another with reference to the object positions and the transponder positions.

15 Claims, 3 Drawing Sheets

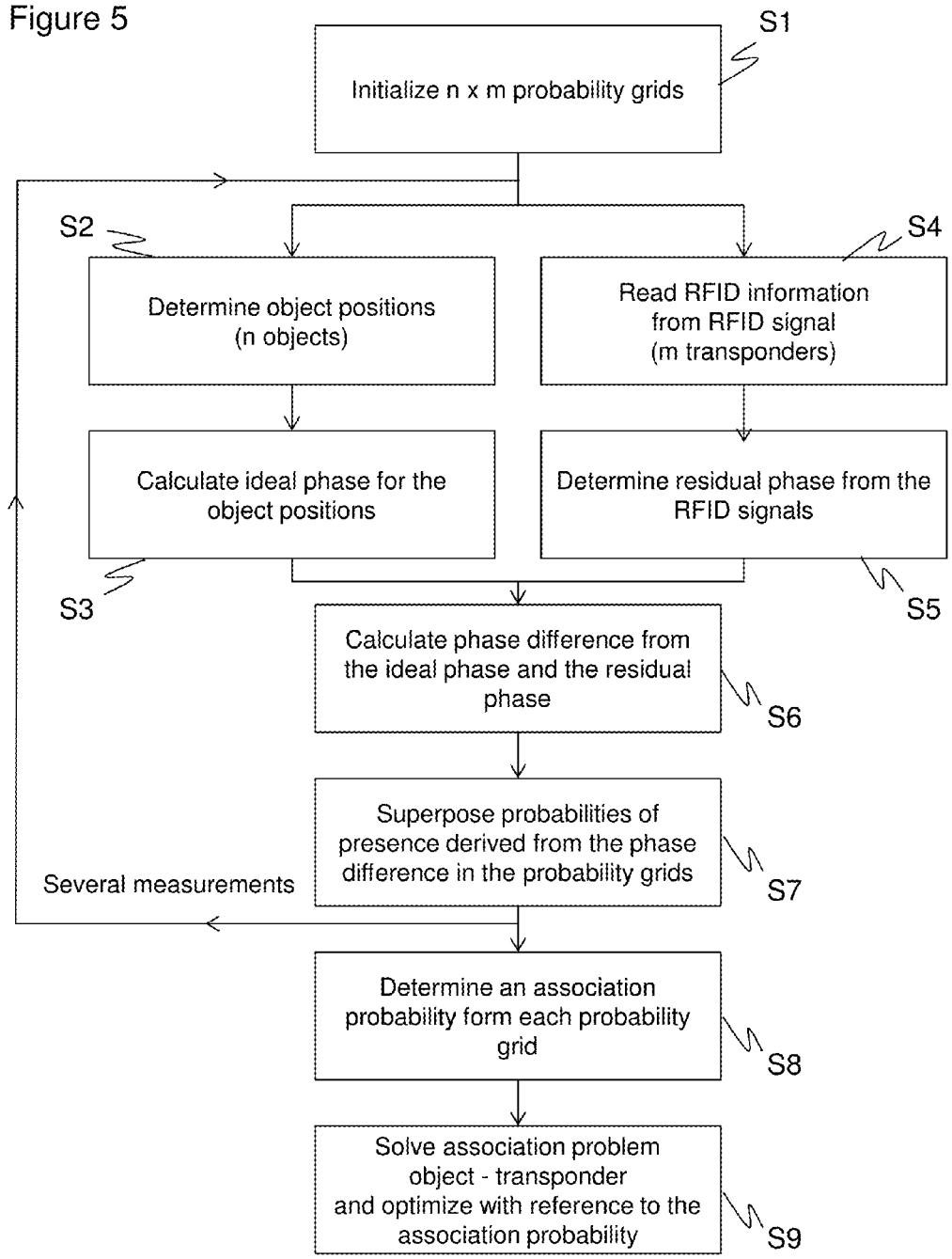

APPARATUS AND METHOD FOR IDENTIFYING AND LOCALIZING OBJECTS

CROSS-REFERENCE TO RELATED APPLICATIONS

This application claims priority to European Patent Application No. 14163115.0, filed on Apr. 2, 2014.

BACKGROUND

1. Field of the Invention

The invention relates to an apparatus and to a method for identifying and localizing objects.

2. Description of Related Art

An identification of objects and goods which is as free of error as possible is necessary for the automation of logistical movements. This takes place at identification points, above all on a change of the owner of the good or on a change of the means of transportation or for a coordination of vehicle movements. An automating identification system is accordingly installed, for example, at an incoming goods area of a logistics center to record incoming and outgoing goods. This results in fast and traceable logistical movements. Further important applications for automatic identification are logistical distribution centers, for instance of package shippers, or the baggage check-in at airports.

RFID (radio frequency identification) technology allows RFID antennas ("transponders" or "tags") also to be detected in an industrial environment. In this respect, in particular an unambiguous identification number can be read out. RFID transponders can basically be active, that is have their own energy supply and generate electromagnetic radiation independently. In practice, however, these transponders are less suitable for an industrial environment and logistics because the unit prices for such transponders cannot reach the low level required for the mass market due to the energy supply. Inexpensive passive transponders without their own energy supply are therefore usually used. In both cases, the transponder is excited to radiate the stored information by electromagnetic radiation of the reading device, with passive transponders taking the required energy from the transmission energy of the reading system.

In addition to the reading out of the information which the transponder bears, applications often also require the exact spatial localization of a plurality of transponders distributed over a small space. In the established ultra-high frequency standard ISO 18000-6, passive transponders are read out using the backscatter process. The detection region for an antenna is relatively large. It is possible to communicate within a plurality of cubic meters with the transponders located there due to the antenna characteristic with an opening angle of approximately 60° and a detection range of at least some meters. The reading unit accordingly provides a certain indirect statement on the presence location of the transponders. The scattering of the position, however, corresponds to the extent of the reading zone and thus amounts to a several meters. A more exact localization is thus initially not possible. A delineation of the detection region by special antenna characteristics or the detection range, for example via the transmission power, only solves the localization problem with restrictions, particularly since a cutting of the reading zone is often not wanted at all.

If it is then not guaranteed that only one object provided with a transponder is located in the relatively large reading zone, ambiguities arise. In this respect, the isolation, that is the association of an RFID reading with a specific transponder, is still solved by the protocol, at least in the ISO 18000-6 standard, in that only one respective specific transponder is prompted to transmit. However, in situations such as in the case of packages on a pallet in which a plurality of transponders are present, no spatial association can thus be made and it can thus not be determined where exactly transponders are located and which object they belong to.

If the objects provided with the transponders move on a conveyor belt in one direction, the localization is facilitated by this condition. It is namely possible at such conveying systems to assume a linear translation known via the sensed conveying system section and it is sufficient under these conditions to determine the position of the transponders once at a position which can be determined at a time which can be determined. A typical application is the association of a transponder with a specific object or package since the reading sequence does not necessarily also correspond with the order of the objects on the conveyor belt. A spatial resolution of only a few decimeters up to some meters is also achieved at conveyor systems due to the large detection region in the translation direction. A large number of error sources additionally interfere with the precision, for instance a variability due to the orientation of the transponder, field inhomogeneities and above all multiple scattering and echoes. The localization and association problem facilitated in this manner accordingly also still requires a solution.

There are approaches in the prior art to read out not only the information stored in the transponder using an RFID reader, but also to localize the transponder with the aid of the RFID signal. In this respect, the respective spacing of the transponder is estimated using different approaches such as the evaluation of the phase information, of the RSSI (received signal strength indicator) or the signal transit time. The localization then takes place by a plurality of measurements at different positions of the transponder or of the RFID reader or with the aid of spatially offset antennas. The localization of passive transponders is technically particularly complex and/or expensive inter alia due to their response behavior. A simple, exact localization is not achieved with these approaches. The spatial resolution, for example, still amounts to up to several meters due to the RSSI.

It is known from DE 199 404 03 A1 to use an optical sensor in addition to the RFID reader. The optical sensor can detect the position of transponders and an association then takes place by a comparison of optical information such as barcodes, the remission behavior or the outer geometry of objects with information stored in the transponder. This accordingly only works when corresponding optical information is separately stored in the transponder for its identification.

EP 2 012 253 B1 combines an RFID reader with a laser scanner. A plurality of fields are configured in the laser scanner which have to be passed through by an object in a certain order. An RFID reading is only then triggered or associated with the triggering object. This approach requires that objects to be identified only follow specific trajectories, in particular at a passage or an RFID gate. It is thus less a localization, since the location of the transponder is predefined it is not freely movable, but more a fixing of suitable reading times whenever a transponder is located at the predefined identification point. In addition, the spatial resolution of the laser scanner is relatively small due to the field-related detection. It is admittedly known per se also to localize objects more accurately using a laser scanner and to track its trajectory (object tracking). However, this would actually be counterproductive in EP 2 012 253 B1 since, unlike the rough trajectory detected by fields, which is mandated by the passing of the RFID reader, the precise trajectory of the objects would not be known at all in advance and would have to be abstracted only in a similar way as with fields to decide whether an object is passing the RFID in a manner provided for an RFID reading or not.

A phase based localization process for passive RFID transponders is known from the paper by R. Miesen et al., "Holographic Localization of Passive UHF RFID Transponders", IEEE International Conference on RFID, 2011, p. 32-37. In this respect, a plurality of phase measurements of the RFID signal of a fixed-position transponder are carried out during the movement of the reading antenna along a known trajectory. A spatial probability distribution is superposed from this from which the transponder position is determined. An RFID reader moved on a known trajectory, however, often does not correspond to the demands on an industrial application where the RFID reader is stationary and the transponder is moved or, in the case of navigation using a moved RFID reader on a vehicle, the trajectory is actually not known. An association of a plurality of transponders with objects is not addressed in the paper.

DE 10 2009 030 076 A1 likewise deals with the localization of an object using a wave-based sensor based on residual phases with a holographic reconstruction. The antenna is here also moved on a known trajectory or on a trajectory estimated using accelerometers to generate a synthetic aperture.

BRIEF SUMMARY

It is therefore an object of the invention to improve the identification and localization of objects using RFID transponders.

This object is satisfied by an apparatus and by a method for identifying and localizing objects. In this respect, on the one hand, positional data of the objects from a position determination device are available as a basis. In addition, an RFID reading device reads RFID information from RFID transponders, that is at least some of the data stored there and in particular an unambiguous identification. The invention then starts from the basic idea of simultaneously localizing and identifying the objects by a combined use of the position determination device and of the RFID reading device. In this respect, transponder positions are determined from the RFID signal and an association of objects and transponders takes place with reference to the object positions and to the transponder positions.

In this respect, at least two scenarios are conceivable. In the one case, the association establishes the localization. The localization with reference to the RFID signal is then only an auxiliary value with a possibly small accuracy to associate the object located by the position determination device with a specific RFID reader and thus with a transponder. An exact localization only takes place on the basis of the association by the positional data of the position determination device. In another case, the localization of the RFID reading device already locates the transponder with sufficient accuracy and the position determination unit serves for the validation or for the redundant localization, with the latter also being able to be utilized for a further increase of the positional accuracy by calculation.

The invention has the advantage that objects are simultaneously identified and localized by the combination of object position determination, RFID reading and transponder position determination. This works for an isolated object having a transponder and equally for a plurality of objects and a plurality of transponders and in particular also an object which has a plurality of transponders, for example a pallet having a plurality of tightly stacked packages, with each individual object being able to bear at least one transponder. The localization takes place with a high positional accuracy also for objects which are completely freely movable. The access to further data stored on the transponder also results with this high positional accuracy with the identification and localization. In this respect, real time demands can also be satisfied, for instance in the material flow in industrial production environments.

The position determination device preferably has a laser scanner. This laser scanner detects object positions, for example, by distance measurement using a pulse based or phase based time of flight of light process. The object positions are thereby detected in two-dimensional polar coordinates or even in three-dimensional spherical coordinates using a respectively known angular position. The laser scanner can achieve a very high spatial resolution and thus allow a highly accurate localization. Alternatively to a laser scanner as a source for the positional data, the utilization of an at least partial compulsory guidance can also be considered, for instance by a conveyor belt at which a trigger light barrier detects passing objects. Further alternatively, the objects themselves can transmit their position, for instance on a determination of a vehicle's own position.

The position determination device is preferably configured for an object tracking. In this respect, not only the instantaneous positions of objects are detected, but also object trajectories are reconstructed over several measurements. Time-dependent object positions are thereby available and there is a clear time association which recognizes the detected objects again at all considered points in time.

The RFID localization device is preferably configured for a phase measurement for distance determination. Strictly speaking, the residual phase module $27c$ is determined and this produces ambiguities which are very relevant with a wavelength in the order of magnitude of 30 cm with UHF RFID. Even if an unambiguous distance measurement were successful, there is thus still a lack of a degree of freedom for an at least two-dimensional position determination after an individual measurement. One-dimensional, ambiguous distance information can, however, also be sufficient in some situations to find an unambiguous association between an object and a transponder or at least to preclude some associations incompatible with the distance information. Alternatively to a phase measurement, the distance can also be determined by a transmit time measurement or by the RSSI.

The RFID localization device is preferably configured to determine distance information from the RFID signal of a transponder for the determination of a transponder position at a plurality of times, to derive probabilities of presence at a location from the distance information and to superpose them in a probability grid. This procedure is also called holographic localization. The distance information at a plurality of times, that is from a plurality of measurements, is gradually superposed in a 2D map called a probability grid. An extension to three dimensions is easily possible, but not necessary for many applications. The probability grid is divided for this purpose into bins or pixels of a size in corresponding to the desired spatial resolution of the localization. It is respectively entered in the pixels how probable it is in accordance with the observed individual measurement with reference to the distance information that the signal source is located at the location represented by the pixel. An individual measurement of a distance produces a circular line of increased probability, whereas the locations which are not located on the circular line are less well compatible or are not compatible with the distance measurement. If a phase measurement underlies the distance measurement, a plurality of concentric circles result at the distance of the wavelength or carrier frequency of the RFID signal due to the periodicity. If the center of these circles now moves from individual measurement to individual measurement because the transponder and the RFID reading device are in a relative movement, the probabilities are superposed statistically or destructively at most locations and only constructively at the actual location of the signal source, in the ideal case in a single pixel where circles of all individual measurements intersect.

The RFID localization device is preferably configured to relate the distance information to an object position. The probabilities of presence at a location superposed in the probability grid are accordingly linked to the object positions of the position determination device. In illustrative terms, the circles named in the previous paragraph are centered about the associated object position in each individual measurement and are not centered, for instance, around the RFID reading apparatus. The RFID reading apparatus can therefore remain stationary. If, in contrast, the probabilities of presence at a location were to relate to a stationary RFID reading apparatus, no point of intersection of maximum construction superposition would result due to the common center of the circles of all individual measurements.

The RFID localization device is preferably configured to relate the distance information to an object position in that an ideal phase corresponding to the distance between the object and the RFID reading device is calculated from the object position and the phase difference between the ideal phase and the phase of the RFID signal is then calculated. For this purpose, therefore a theoretical or ideal phase is first reconstructed from the object positions which would be measured for an RFID signal from a transponder at this object position. The phase determined from an RFID signal is subsequently converted to the location of the object in that the difference is formed with the ideal phase. In this manner, the highly accurate positional data already flow into the determination of transponder positions from the RFID signal at a very early time and in particular prior to the association of objects and transponder.

The RFID localization device is preferably configured respectively to form a probability grid per object and RFID transponder. Each probability grid thus forms a hypothesis for a specific pair of object and transponder and how probable this association hypothesis is can be recognized from the constructive or destructive superposition of the individual measurements. To cover all association possibilities, up to n×m probability grids are produced for n objects and m transponders.

The RFID localization device is preferably configured to determine a global measure of a probability grid. The statement of the probability grid should thus be condensed to a value which is easy to handle, in particular a scalar quantity or a percentage. The global measure is a measure of quality for the hypothesis underlying the probability grid that therefore the transponder and the object belong together, from whose positional data and RFID signals the probability grid was formed. The global measure can simply be the pixel having the maximum value since there the constructive superposition and thus the probability of presence at a location were the largest. Other measures are conceivable; for instance, the integration over a specific neighborhood of pixels, since the strongest probability cloud does not necessarily also contain the individual pixel having the highest value, for instance with overshoots due to erroneous measurements.

The RFID localization device is preferably configured to form and/or evaluate a probability grid only for an environment of a position of the RFID reading device. Environment means a direct neighborhood of, for example, some pixels or some tens of pixels. The environment is thus in particular smaller or even small with respect to the reader range. The restriction to the environment of the position of the RFID reading device results in a much smaller memory and calculation effort. It is conceivable in this respect already to carry out this limitation on the forming of the probability grids or only on its evaluation for locating the global measure. The restriction to the environment of the RFID reading device is based on the consideration that pixels outside this environment do not anyway correspond to a plausible hypothesis. Since namely in this embodiment the probabilities of presence at a location entered into the probability grid are related to an object position as a potential transponder position, a maximum superposition of a correct hypothesis has to be formed in the signal source, namely in the RFID reading device. For simplification, the origin of the probability grid can be placed at the position of the RFID reading device so that then an environment of the origin is observed.

The association device is preferably configured to optimize a cost function based on the global measure in the association of objects and RFID transponders. The input data for the association optimization are the probability statements on the association of a transponder with an object for all conceivable pairs condensed in the global measure. It is now not sufficient to associate the transponder with each object with maximum probability or vice versa. This does not necessarily optimize the association as a whole. In addition it is a priori in no way clear that every object detected with positional data bears exactly one transponder. The cost function optimized with the association relates to the global measure, but does not have to be identical. For example, weightings can be introduced or conditions such that associations are not permitted with probabilities beneath a threshold or associations with a probability above a threshold are maintained if consistently possible in any way. The association device thus finds an association of objects and transponders which is the most plausible overall. Such a process for solving weighted association problems is known per se, for example the Hungarian method or the Kuhn-Munkres algorithm.

The position determination device is preferably configured to determine contour information of the objects, with the association device including the contour information in the association of objects and RFID transponders. Such contour data are in particular co-detected with the object positions by a laser scanner. Prior knowledge on whether transponders are expected with specific objects can flow in via the contour data. For example, depending on the application, persons do not bear any transponders or always bear a transponder in a safety zone. Parallelepiped-shaped objects can be crates or packages having exactly one or at least one transponder. A number of tightly packed objects possibly not differentiated by the laser scanner and having a plurality of transponders are expected at a pallet. Very small objects are rather disrupters without transponders.

The method in accordance with the invention can be designed in a similar manner by further features and shows similar advantages in this respect. Such further features are described in an exemplary, but not exclusive manner in the dependent claims following the independent claims.

A probability grid is preferably formed for every possible pair of an object and of an RFID transponder in which probability grid probabilities of presence at a location from a plurality of evaluations of the phase of the RFID signal at different times are superposed, with a high probability of presence at a location respectively being present at locations which correspond to the phase difference from an ideal phase corresponding to the distance between the object and the RFID reading device and the phase of the RFID signal. A hypothesis is thus formed for every conceivable association of a transponder with an object and a holographic localization is carried out which is related to the respective object position, for example in that the accumulated probability of pixels on circular lines corresponding to the phase difference is considerably increased and otherwise everywhere reduced.

A respective global measure is then preferably determined from the probability grids for the probability that that RFID transponder and that object belong together with respect to which the probability grid was formed and on the association of objects and RFID transponders a cost function is optimized which is based on the global measures. The association hypotheses represented by the probability grids are thus condensed to a simple value and are thus accessible to a process for an association optimization.

BRIEF DESCRIPTION OF THE SEVERAL VIEWS OF THE DRAWINGS

The invention will also be explained in the following with respect to further advantages and features with reference to the enclosed drawing and to embodiments. The Figures of the drawing show in:

FIG. 5 a flowchart for explaining the method steps in an embodiment of the identification and localization of objects.

DETAILED DESCRIPTION

Figure 1:
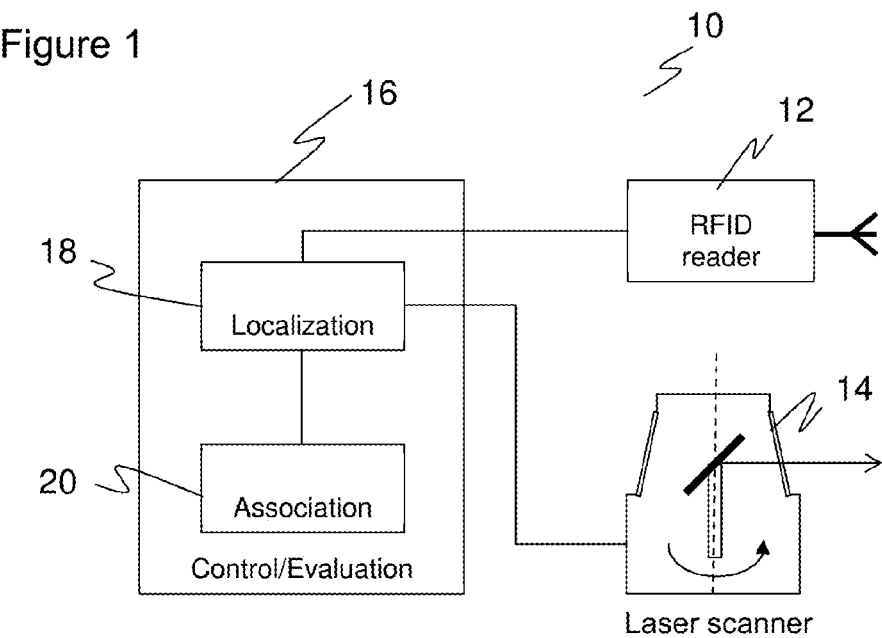
FIG. 1 a schematic representation of an apparatus for identifying and localizing using an RFID reader and a laser scanner.

FIG. 1 shows a schematic representation of an apparatus 10 for identifying and localizing objects. The apparatus 10 comprises an RFID reader 12, a laser scanner 14 as well as a control and evaluation unit 16. This separation into three blocks only to be understood as functional. The control and evaluation function can equally be integrated in the RFID reader 12 and/or in the laser scanner 14 or can be distributed almost as desired. It is also conceivable to configure the RFID reader 12 and the laser scanner 14 as a common device.

The RFID reader 12, for example, works according to the UHF standard ISO 1800-6 or EPCglobal UHF Gen 2 with passive transponders. The invention is, however, not restricted to either passive transponders or UHF signals or even to a specific UHF standard since it only utilizes general wave properties of the RFID signals. The frequency range for the carrier frequency lies at 868 MHz in the named standard; the wavelength thus amounts to approximately 34 cm. The communication between the reader and the transponders is half duplex, i.e. the transmission antenna constantly transmits a signal to the energy supply, but the downlink and the uplink alternate sequentially. The uplink, that is the communication from the transponder to the reader takes place by backscatter modulation of the transponder and its linearly polarized antenna, while the reader transmits a CW signal at a known frequency. The standardized protocol ensures the isolation of a transponder from the transponder population located in the detection region in that only a single transponder known via its ID is active in each uplink sequence.

The laser scanner 14 comprises a rotatable deflection unit, in particular a rotating mirror, and scans a monitored plane with a laser light beam in the course of the rotational movement. In this respect, the time of flight of light is preferably determined to a scanned object and thus its distance. In addition, the respective angular position is detected, for instance via an encoder. Object positions of objects in the monitored plane are thus provided by the laser scanner 14 in two-dimensional coordinates and, as required, object contours are also provided. Three-dimensional laser scanners can also be provided by additional tilting of the monitored plane.

The RFID reader 12 and the laser scanner 14 are only explained in rough terms since such devices are known per se.

The object of the RFID reader 12 is the reading of RFID information from transponders in a reading zone and the provision of the RFID signals detected in this process in order thus to carry out a distance measurement of the transmitting transponder. The laser scanner 14 serves to detect object positions, in particular also over a longer time period by an object tracking algorithm so that the objects are recognized again at different points in time and their trajectory can be reconstructed. Alternatively to a detection by the laser scanner 14, object positions can also be provided in another manner, for instance as temporally resolved trajectories of unknown objects or as general information which can be converted into trajectory hypotheses. For example, on a use at a conveying system of encoder data of the conveyor and the temporal information of a light barrier triggered by entering objects, one or more hypothetical objects are calculated. Another example is a vehicle positioning system of, for instance, a driverless transport system (AGV, automated guided vehicle) or of another vehicle which transmits the vehicle trajectory to the control and evaluation unit 16 of the apparatus 10 instead of the laser scanner 14.

The control and evaluation unit 16 can thus make use of the following input data: RFID information from the RFID reader 12, in particular including unambiguous identification numbers of the transponders from which the respective RFID information was read and the RFID signal or a characteristic of the RFID signal such as its phase, transit time or RSSI and object positions from the laser scanner 14, in particular dependent on time or as trajectories. These input data are used in a localization device 18 to determine transponder positions and subsequently the object positions and the transponder positions are used in an association device 20 to associate objects and transponders with one another in accordance with predefined optimization criteria. The objects are then unambiguously identified on the basis of the RFID information and are also precisely localized on the basis of the accurate object positions of the laser scanner 14. The function of the localization device 18 and the association device 20 will be explained in more detail in the following.

Figure 2:
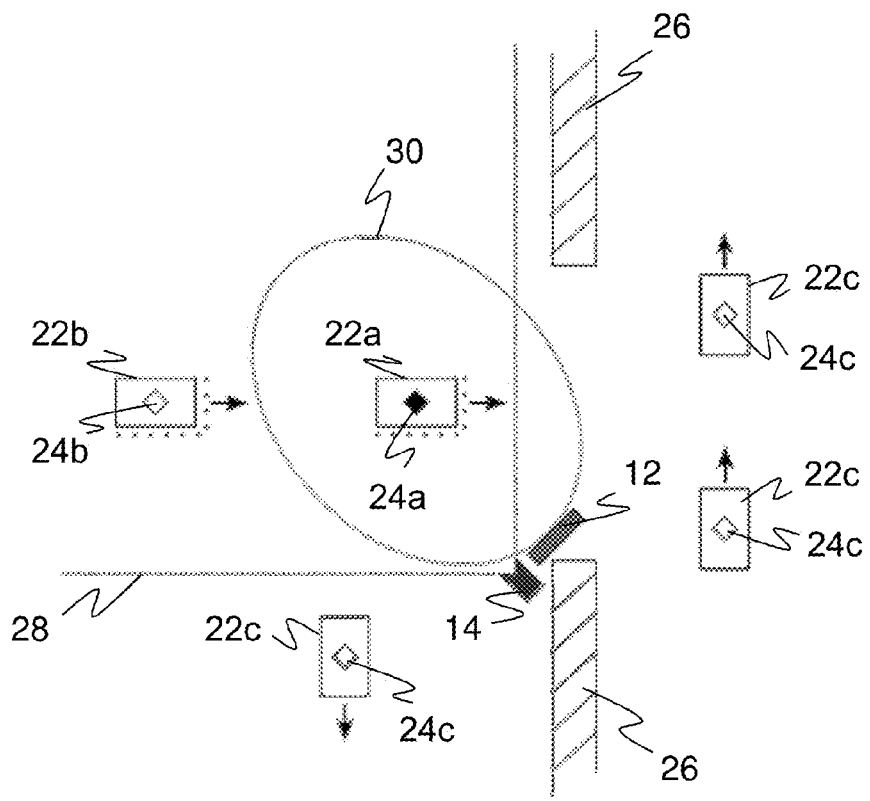
FIG. 2 a plan view of an exemplary arrangement of the apparatus in accordance with FIG. 1 at a region with a plurality of objects and transponders.

FIG. 2 shows a plan view of an exemplary arrangement of the apparatus 10 with the RFID reader 12 and the laser scanner 14 at a region having a plurality of objects 22a-c, which each bear a transponder 24a-c. The control and evaluation unit 16 is not shown for reasons of clarity or is integrated in the RFID reader 12 or in the laser scanner 14. Arrows designate the direction of movement of the objects 22a-c, of which only some move through an opening bordered by walls 26. In a number of applications, only such objects 22a-b are of interest to the apparatus, but other objects 22c are also regularly detected by the laser scanner 14 and in particular by the RFID reader 12 which can only be poorly screened on a specific reading field.

The laser scanner 14 detects the positions of the objects 22*a-b* in its monitored zone 28 which is configurable and which is here restricted to 90°, for example. The scans are indicated by dots beneath the objects 22*a-b*. On the other hand, the RFID reader 12 reads RFID information from transponders 24*a* within a reading zone 30. In practice, the reading zone 30 is by no means as tightly limitable as shown. It can therefore by no means be precluded that other transponders 24*b, c* outside the provided reading zone 30 can also be read out. Conversely, there can also be detections of objects 22*b* by the laser scanner 14 whose transponder 24*b* is not read.

In addition to the reading process with identification with reference to RFID information stored on the transponder, a distance measurement with reference to the RFID signal also takes place. This evaluation can be implemented in the RFID reader 12, but is described here in the localization device 18 of the control and evaluation unit.

Figure 3:
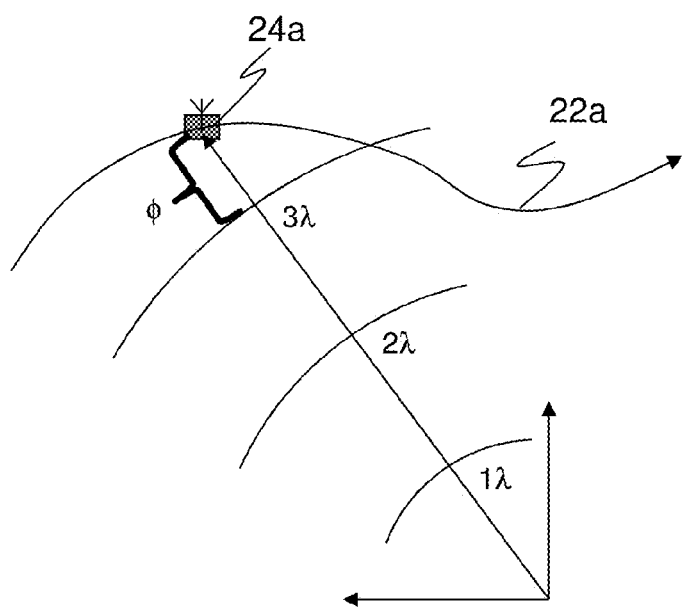
FIG. 3 a representation for explaining the residual phase in a phase based distance measurement.

FIG. 3 illustrates a distance measurement with reference to the phase of the RFID signal. A coordinate system is defined there such that the RFID reader 12 is located at its origin. The phase $\phi$ determined from the RFID signal, more exactly the residual phase modulo $2\pi=\lambda$, is a measure for the distance, but still contains an ambiguity. At which of the drawn circular lines the transponder 24*a* is spaced apart by a distance corresponding to the phase $\phi$ cannot be decided solely from a measurement of the phase $\phi$. Even an unambiguous distance measurement would only fix the location of the transponder 24*a* to one circular line since angular information is lacking. The trajectory of the object 22*a*, in contrast, is known by the object tracking of the laser scanner 14. It is now the object of the localization device 18 also to derive the transponder position at least so exactly from the RFID signal that an association of the object 22*a* and the transponder 24*a* becomes possible with reference to the object positions and the transponder positions.

This evaluation of the phase measurement in the localization device 18 takes place with reference to a holographic localization. In this respect, the phase $\phi$ is determined repeatedly in different stages of the movement of the object 22*a* along its trajectory. Locations are determined from each individual measurement at which the transponder 24*a* is located with high probability in accordance with the determined phase $\phi$. In this respect, for example, concentric circular rings result at a spacing $\lambda$ from one another. The regions between the circular rings, in contrast, only have a small probability of presence at a location since these locations of the transponders 24*a* are not compatible or are only poorly compatible with the phase $\phi$ of the individual measurement. If the distance is not measured by a phase measurement, but rather in a different manner, for instance by signal transit time or RSSI, the ambiguity is dispensed with in the distance direction, but not in the angular direction.

In order not to evaluate the result of a plurality of individual measurements together, a probability grid is formed which is initially an empty 2D map with bins or pixels which each represent a location of the transponder 24*a* within the reading zone 30. The probabilities of presence at a location from the individual measurements are gradually superposed in the probability grid. At the point of intersection of the circular lines of the individual measurements, this superposition will produce constructive reinforcement, but in the intermediate zones they will produce a destructive superposition or at least a producing of a mean. The transponder 24*a* can therefore be localized where the probability of presence at a location is the largest after a plurality of individual measurements.

Figure 4:
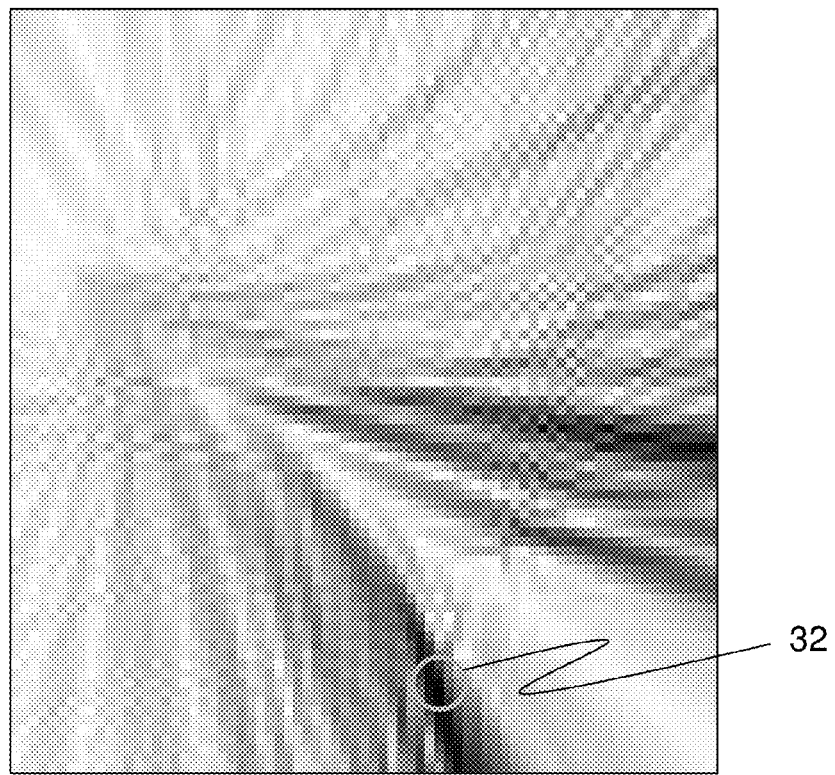
FIG. 4 an exemplary probability grid with whose aid the location of a signal source is reconstructed in a holographic localization.

FIG. 4 shows an exemplary probability grid after a plurality of individual measurements, with the probabilities being encoded in black and white. A squiggle 32 marks the location of the highest probability and thus the reconstructed transponder position.

According to this overview representation of the holographic localization, the individual steps for the identification and localization will be explained in more detail in an exemplary embodiment of the invention with reference to the flowchart of FIG. 5.

The probability grids are initialized in a step S1. Each probability grid corresponds to an association hypothesis for a specific object 22 and a specific transponder 24. Accordingly, the residual phases $\phi$ related to the ith object 22 are superposed in the probability grid (i, j) for the jth transponder 24. If a hypothesis should be set up for every conceivable association for n objects 22 and m transponders 24, n×m probability grids are accordingly required. On a change of the number of objects 22 or transponders 24 in the monitored zone 28 or in the reading zone 30, the number of probability grids would also have to be adapted again; however the further description assumes a constant number of objects 22 and transponders 24 at least up to the completion of the identification and localization.

The laser scanner 14 determines the object positions in a step S2 in a left branch of the flowchart. It is ensured by an object tracking algorithm that the n objects are recognized again at different points in time. Theoretical or ideal residual phases are subsequently calculated from the object positions in a step S3. The ideal residual phase is that residual phase which the RFID reader 12 would measure in a theoretical observation from an RFID signal from a transponder at the object position.

The RFID reader 12 reads RFID information from the m transponders in a step S4 in a right branch of the flow chart. The transponders are thereby identified and practically any desired additional properties can be associated with it which are stored on the transponders. In addition, in a step S5, the residual phases $\phi$ are determined from the respective RFID signals of the transponders in order first to detect the distances and from these also the complete transponder positions while including the subsequent steps after a plurality of measurements.

In a step S6, the holographic localization is further prepared in that a phase difference is formed between the ideal residual phases calculated from the object positions in step S3 and the residual phases $\phi$ measured in the RFID signals in step S5. The residual phases $\phi$ measured from the position of the RFID reader 12 in step S5 are related to the object positions by this difference formation. The holographic localization can thereby start from the object positions instead of from the position of the RFID reader 12. In illustrative terms, therefore, instead of the usually fixed positions of the RFID reader 12, the respective object positions which vary along the trajectories over time and which were determined in the object tracking form the centers of the circular lines of highest probability of presence at a location. The circular lines superposed in the probability grid at different points in time can thereby intersect one another and so superimpose constructively, whereas they would always lie concentrically to one another with respect to a fixed position and there would thus not be any characterized pixel of the probability grid which corresponds to the sought localization.

In a step S7, the phases differences just calculated from the current individual measurement in step S6 are superposed in the probability grid. In this respect, correspondingly large amounts are added for probabilities of presence at a location which are high in accordance with the phase differences and low or even negative amounts are added for low probabilities of presence at a location. A preferred embodiment allocates circular lines having radii corresponding to $\phi+i*\lambda$ a high probability of presence at a location and all intermediate zones a low probability of presence at a location. It is, however, also possible to modulate the probability of presence at a location radially, sensibly with a period $\lambda$ and a phase $\phi$ or to use a different suitable spatial distribution of the probability of presence at a location.

The superposition of an individual measurement in the probability grid described in steps S2 to S7 is repeated for a fixed number of at least two or three measurements, approximately ten measurements have proved themselves in practice, so that, as shown by way of example in the squiggle 32 in FIG. 4, a pixel or a region with a sufficiently large probability of presence at a location becomes apparent. Instead of a fixed number of iterations, a check can also be made before each repetition, for instance using a threshold evaluation, whether the achieved holographic localization is already sufficient and the loop is then aborted. It is furthermore conceivable to continue the repetitions constantly to obtain the maximum possible measurement information. However, then currently already achieved intermediate results of the association, identification and localization can be calculated and displayed or provided at an interface in the meantime by the following steps S8 and S9.

As soon as the probability grids allow a further evaluation on the basis of one of the named criteria, a summarizing probability or evaluation, called a global measure here, is formed from each probability grid in a step S8 for the hypothesis represented by the probability grid that the object i and the transponder j are to be associated with one another. The global measure is, for example, the most significant pixel in the probability grid or the integration over a small neighborhood which forms the highest probability of such neighborhoods in sum. In the example, now used a multiple of times, of circular lines of high probability of presence at a location, this corresponds to the point of intersection of all circular lines or at least of as many circular lines as possible from the individual measurements. FIG. 4 shows this pixel or this neighborhood in an example within the squiggle 32.

A special feature results from the fact that the holographic localization is related to the object positions. The most significant pixel is therefore not shown, as was perhaps naively to be expected, at the transponder position, since the transponder position on the contrary determines by definition and by the procedure the centers of the circular lines. The position of the RFID reader 12 is therefore conversely localized from the viewpoint of the transponder. The localization information thus acquired is equivalent. However, an advantage results from the fact that a high probability of presence at a location can only accumulate at the position of the RFID reader 12 for plausible hypotheses. This namely means that in a preferred embodiment the search for the most significant pixel or even just the formation of the probability grids can in total be limited to an environment of the position of the RFID reader 12. The calculation and memory effort is thereby reduced to a very substantial degree. The position of the RFID reader 12 can additionally be placed in the origin of the probability grids in order further to simplify the calculations.

After the step S8, an in particular scalar evaluation number as to how probable this hypothesis is correct is then present for all hypotheses "transponder j belongs to object i".

A weighted association problem is now set with these evaluation numbers in a step S9. In this respect, what is sought is that arrangement of objects to transponders which is most probably correct consistently per se and as a whole, measured at a cost function based on the evaluation numbers from step S8. Consistently per se means, for example, that neither an object nor a transponder can be located at a plurality of locations simultaneously. In addition, conditions can be set such as that every object is to be unambiguously associated with exactly one transponder, each object bears at least one transponder and/or no more than a specific number of transponders, or that a transponder cannot remain isolated without an object at least when its transponder position was determined within the monitored zone 28. The cost function can directly map the evaluation number. If then, for example, the evaluation number was calculated as a probability, the cost function evaluates an association as a whole simply as a product of these probabilities. This direct correlation is, however, by no means necessary; the cost function can also carry out other weightings such that improbable hypotheses are not accepted as true wherever possible, and indeed to a higher degree than indicated by the evaluation number; or highly probably hypotheses are consistently accepted as true whenever possible. Possible algorithms for the described weighted association problem are known per se in the prior art; for example, the Hungarian method or the Kuhn-Munkres algorithm, and are therefore not explained further here.

The objects and transponders are now associated with one another as the result of the method described with reference to FIG. 5. This means that the highly accurate object position and even the total trajectory is now simultaneously known by the measurement of the laser scanner 14 and the unambiguous identification based on the information read from the transponder by the RFID reader 12. The localization and identification information can equally be displayed at the apparatus 10 or at a monitor at least indirectly connected thereto or can be output to further control systems via interfaces. Practically any desired further information can be read out of the transponder with the identification or can be read out of a database with reference to the identification. If the access even takes place to a database over a network, information can thus be assigned without limitation to the object or conversely information on the object acquired from the apparatus 10 can be forwarded.

The invention claimed is:

1. An apparatus for identifying and localizing objects, having a position determination device for determining object positions and having an RFID reading device for receiving an RFID signal from an RFID transponder and for reading RFID information from the RFID signal,
   the apparatus further having an RFID localization device for determining transponder positions with the aid of the RFID signal and having an association device which is configured to associate objects and RFID transponders with one another with reference to the object positions and the transponder positions, and
   wherein the RFID localization device is configured to determine distance information from the RFID signal of a transponder for the determination of a transponder position at a plurality of times, to derive probabilities of presence at a location from the distance information and to superpose them in a probability grid.

2. The apparatus in accordance with claim 1,
   wherein the position determination device has a laser scanner.

3. The apparatus in accordance with claim 1, wherein the position determination device is configured for an object tracking.

4. The apparatus in accordance with claim 1, wherein the RFID localization device is configured for a phase measurement for the distance determination.

5. The apparatus in accordance with claim 1, wherein the RFID localization device is configured to relate the distance information to an object position.

6. The apparatus in accordance with claim 1, wherein the RFID localization device is configured to relate the distance information to an object position in that an ideal phase corresponding to the distance between the object and the RFID reading device is calculated from the object position and the phase difference between the ideal phase and the phase of the RFID signal is then calculated.

7. The apparatus in accordance with claim 1, wherein the RFID localization device is configured respectively to form a probability grid per object and RFID transponder.

8. The apparatus in accordance with claim 1, wherein the RFID localization device is configured to determine a global measure of a probability grid.

9. The apparatus in accordance with claim 1, wherein the RFID localization device is configured to form and/or evaluate a probability grid only for an environment of a position of the RFID reading device.

10. The apparatus in accordance with claim 9, wherein the association device is configured to optimize a cost function based on the global measure on the association of objects and RFID transponders.

11. The apparatus in accordance with claim 1, wherein the position determination device is configured to determine contour information of the objects; and wherein the association device includes the contour information on the association of objects and RFID transponders.

12. A method for identifying and localizing objects, the method comprising the steps of:

receiving an RFID signal of an RFID transponder from an RFID reader and reading RFID information from the RFID signal;

determining object positions of the objects independently of the RFID signal;

determining transponder positions with the aid of the RFID signal;

associating the objects and the RFID transponders with one another with reference to the object positions and to the transponder positions:

determining distance information from the RFID signal of a transponder for the determination of the transponder position at a plurality of times; and deriving probabilities of presence at a location from the distance information and superposing the probabilities in a probability grid.

13. The method in accordance with claim 12, wherein the step of determining object positions is carried out by means of a laser scanner by object tracking.

14. The method in accordance with claim 12, further comprising the step of:

forming the probability grid for every possible pair of an object and of an RFID transponder in which probability grid probabilities of presence at a location from the plurality of evaluations of the phase of the RFID signal at different times are superposed, with a high probability of presence at a location respectively being present at locations which correspond to the phase difference from an ideal phase corresponding to the distance between the object and the RFID reading device and the phase of the RFID signal.

15. The method in accordance with claim 14, further comprising the steps of:

determining a respective global measure from the probability grids for the probability that that RFID transponder and that object belong together with respect to which the probability grid was formed; and, on the association of objects and RFID transponders, optimizing a cost function which is based on the global measure.

* * * * *